United States Patent
Zhou et al.

(10) Patent No.: US 10,769,477 B2
(45) Date of Patent: Sep. 8, 2020

(54) METHOD, APPARATUS, DEVICE AND STORAGE MEDIUM FOR EXTRACTING A CARDIOVISCERAL VESSEL FROM A CTA IMAGE

(71) Applicant: Shenzhen Institutes of Advanced Technology, Nanshan Shenzhen (CN)

(72) Inventors: Shoujun Zhou, Nanshan Shenzhen (CN); Baochang Zhang, Nanshan Shenzhen (CN); Baolin Li, Nanshan Shenzhen (CN); Cheng Wang, Nanshan Shenzhen (CN); Pei Lu, Nanshan Shenzhen (CN)

(73) Assignee: SHENZHEN INSTITUTES OF ADVANCED TECHNOLOGY, Shenzhen, Guangdong (CN)

( * ) Notice: Subject to any disclaimer, the term of this patent is extended or adjusted under 35 U.S.C. 154(b) by 133 days.

(21) Appl. No.: 16/044,662

(22) Filed: Jul. 25, 2018

(65) Prior Publication Data
US 2019/0034750 A1  Jan. 31, 2019

(30) Foreign Application Priority Data
Jul. 26, 2017 (CN) .......................... 2017 1 0618659

(51) Int. Cl.
*G06K 9/00* (2006.01)
*G06K 9/34* (2006.01)
(Continued)

(52) U.S. Cl.
CPC ................. *G06K 9/34* (2013.01); *G06K 9/38* (2013.01); *G06K 9/4604* (2013.01);
(Continued)

(58) Field of Classification Search
CPC . G06T 2207/20036; G06T 2207/10081; G06T 2207/30101; G06T 2207/20061;
(Continued)

(56) References Cited

U.S. PATENT DOCUMENTS

| | | | |
|---|---|---|---|
| 2008/0086204 A1* | 4/2008 | Rankin ................. | A61F 2/2418 623/2.38 |
| 2010/0128942 A1* | 5/2010 | Licato .................. | G06T 7/0014 382/128 |

(Continued)

FOREIGN PATENT DOCUMENTS

CN  103914814  *  7/2014  ............... G06T 5/50

*Primary Examiner* — Amara Abdi
(74) *Attorney, Agent, or Firm* — Woodard, Emhardt, Henry, Reeves & Wagner, LLP (57) ABSTRACT

Disclosed are a method, an apparatus, a device and a storage medium for extracting a cardiovisceral vessel from a CTA image, including: performing corrosion operation and expansion operation on an image data successively via a preset structural element to obtain a structure template, wherein the image data is a coronary angiography image after a downsampling processing, and the structure template is a structure excluding a pulmonary region; performing a transformation in layer-by-layer on slice images of the structure template to acquire a first ascending aorta structure in the structure template, and acquiring an aorta center coordinate and an aorta radius in the last layer of slice image of the structure template; and establishing a binarized spherical structure according to the aorta center coordinate and the aorta radius, and synthesizing a second ascending aorta structure by combining the first ascending aorta structure with the structure template and the binarized spherical structure.

10 Claims, 3 Drawing Sheets

S101 — A corrosion operation and an expansion operation are performed on an image data successively via by using a preset structural element, to obtain a structure template S102 — A by performing layer-by-layer transformations are performed in layer-by-layer on slice images of the structure template, to acquire a first ascending aorta structure is acquired in the structure template, and an aorta center coordinate and an aorta radius are acquired in the last -layer of slice image of the structure template S103 — A binarized spherical structure is established according to the aorta center coordinate and the aorta radius, and a second ascending aorta structure is synthesized by combining the first ascending aorta structure with the structure template and the binarized spherical structure (51) Int. Cl.
*G06K 9/38* (2006.01)
*G06K 9/46* (2006.01)
*G06T 7/00* (2017.01)
*G06T 7/11* (2017.01)
*G06T 7/155* (2017.01)
*G06T 7/50* (2017.01)

(52) U.S. Cl.
CPC .............. *G06T 7/0012* (2013.01); *G06T 7/11* (2017.01); *G06T 7/155* (2017.01); *G06K 2209/05* (2013.01); *G06T 7/50* (2017.01); *G06T 2207/10081* (2013.01); *G06T 2207/20036* (2013.01); *G06T 2207/20061* (2013.01); *G06T 2207/20212* (2013.01); *G06T 2207/30048* (2013.01); *G06T 2207/30101* (2013.01)

(58) Field of Classification Search
CPC . G06T 2207/20212; G06T 2207/30048; G06T 7/0012; G06T 7/11; G06T 7/155; G06T 7/50; G06K 9/34; G06K 9/38; G06K 9/4604; G06K 2209/05
See application file for complete search history.

(56) References Cited

U.S. PATENT DOCUMENTS

| | | | | |
|---|---|---|---|---|
| 2011/0243403 | A1* | 10/2011 | Mizuno | G06T 7/0012 |
| | | | | 382/128 |
| 2015/0131880 | A1* | 5/2015 | Wang | G06T 7/33 |
| | | | | 382/131 |
| 2018/0028137 | A1* | 2/2018 | Zhao | G06T 7/187 |

\* cited by examiner

METHOD, APPARATUS, DEVICE AND STORAGE MEDIUM FOR EXTRACTING A CARDIOVISCERAL VESSEL FROM A CTA IMAGE

TECHNICAL FIELD

The present disclosure relates to the field of medical image processing technologies, and in particular, to a method, an apparatus, a device and a storage medium for extracting a cardiovisceral vessel from a CTA image.

BACKGROUND

As an image preprocessing measure, cardiovisceral vessel extraction plays an very important role in visualization of clinical diagnosis, interventional operation planning and interventional therapy processes, and it extracts an ascending segment of the heart aorta from a 3D medical vasography image and enhances the coronary artery vessel. Because Computed Tomography (CT) Angiography (CTA) on a heart exhibits a complex organizational structure and background noise, the contrast of blood vessels in the heart is very small, and the contrast of the outer pulmonary artery is very high, so that the difficulty for extracting the aorta and the coronary artery vessel from a heart CTA image is increased. Specifically, there always are pulmonary blood vessel structures in the CTA coronary imaging of the heart, so that the diagnosis effect may be affected. It has been a great challenge how to suppress the pulmonary blood vessel brightness and enhance the cardiovisceral vessel brightness. When the traditional multi-scale filtering is employed to enhance the cardiovisceral vessel, the ascending aorta is extracted and the coronary artery vessel is enhanced according to the space morphology information of the target and in conjunction with the traditional multi-scale filter enhancement. The axial projection after multi-scale filtering has a high response in the pulmonary region with a very high contrast between the blood vessel and the background, but has very small or even no response in the heart region with a small contrast between the blood vessel and the background, because the aorta, the cardiovisceral vessel and the chamber of the heart exhibit the same contrast agent concentration in the injection environment of the contrast agent. As such, the signal-to-noise ratio in each structural region is very small. Therefore, no good result can be obtained based on the traditional coronary artery enhancement method.

SUMMARY

It is an object of the present disclosure to provide a method, an apparatus, a device and a storage medium for extracting a cardiovisceral vessel from a CTA image so as to solve the problem in the prior art that there is no effective method for extracting a cardiovisceral vessel from a CTA image so that the pulmonary blood vessel structures are always present.

In an aspect, an embodiment of the present disclosure provides a method for extracting a cardiovisceral vessel from a CTA image, where the method includes the steps of:

performing a corrosion operation and an expansion operation on an image data successively via a preset structural element to obtain a structure template, wherein the image data is a coronary angiography image after a downsampling processing, and the structure template is a structure excluding a pulmonary region;

performing a transformation in layer-by-layer on slice images of the structure template to acquire a first ascending aorta structure in the structure template, and acquiring an aorta center coordinate and an aorta radius in the last layer of slice image of the structure template; and establishing a binarized spherical structure according to the aorta center coordinate and the aorta radius, and synthesizing a second ascending aorta structure by combining the first ascending aorta structure with the structure template and the binarized spherical structure.

In another aspect, an embodiment of the present disclosure provides an apparatus for extracting a cardiovisceral vessel from a CTA image, where the apparatus includes:

a structure template acquiring unit, configured for performing a corrosion operation and an expansion operation on an image data successively via a preset structural element to obtain a structure template, wherein the image data is a coronary angiography image after a downsampling processing, and the structure template is a structure excluding a pulmonary region;

a layer-by-layer transformation unit, configured for performing a transformation in layer-by-layer on slice images of the structure template to acquire a first ascending aorta structure in the structure template, and acquiring an aorta center coordinate and an aorta radius in the last layer of slice image of the structure template; and a synthesizing unit, configured for establishing a binarized spherical structure according to the aorta center coordinate and the aorta radius and synthesizing a second ascending aorta structure by combining the first ascending aorta structure with the structure template and the binarized spherical structure.

In still another aspect, an embodiment of the present disclosure provides a device for extracting a cardiovisceral vessel from a CTA image, where the device includes: a memory, a processor and a computer program that is stored in memory and is executable on the processor, wherein the steps of the method for extracting a cardiovisceral vessel from a CTA image are implemented when the computer program is executed by the processor.

In yet another aspect, an embodiment of the present disclosure provides a computer-readable storage medium having a computer program stored thereon, wherein the steps of the method for extracting a cardiovisceral vessel from a CTA image are implemented when the computer program is executed by a processor.

In the disclosure, a corrosion operation and an expansion operation are performed on the image data to corrode the lung-related structures and to preserve the structures of the heart and the aorta. The first ascending aorta structure is acquired via the transformation in layer-by-layer, and a second ascending aorta structure is synthesized by combining the first ascending aorta structure with the binarized spherical structure. Corrosion is performed via a morphological opening operation, so that a supplementary region at the root of the ascending aorta is obtained, thereby extracting the shapes of the ascending aorta and the aortic sinus at the root thereof. Therefore, the structure and the form of the aorta can be precisely visualized, to provide an important reference for the automatic centerline extraction, partition and computer intelligence-assisted intervention of blood vessels, thereby greatly improving the level and capacity of medical image researches in solving clinical issues.

DETAILED DESCRIPTION

In order to make the objects, technical solutions and advantages of the disclosure more apparent, the disclosure will be further illustrated in detail in conjunction with the drawings and embodiments. It should be understood that, the embodiments described here are only set for explaining, rather than limiting, the disclosure.

The specific implementation of the disclosure will be described in detail below in conjunction with specific embodiments:

Embodiment 1

Figure 1:
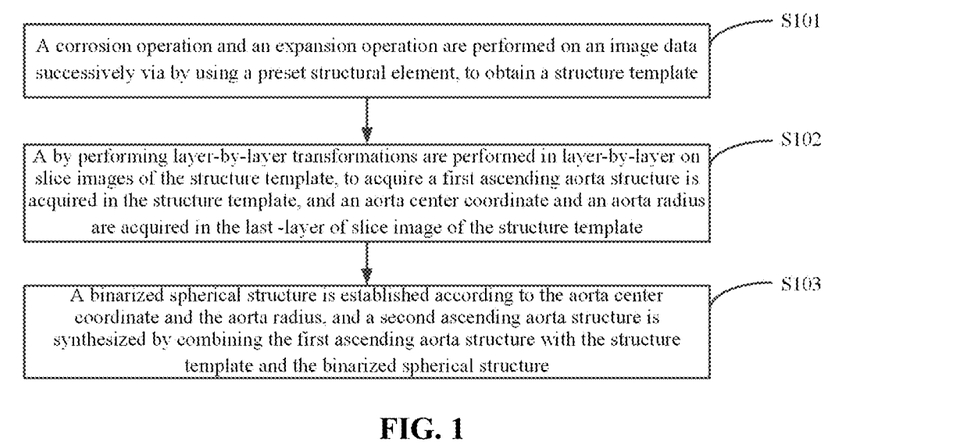
FIG. 1 is a flow chart of a method for extracting a cardiovisceral vessel from a CTA image according to Embodiment 1 of the disclosure.

FIG. 1 shows a flow chart of a method for extracting a cardiovisceral vessel from a CTA image according to Embodiment 1 of the disclosure. For easy illustration, only the parts related to an embodiment of the disclosure are shown. The method includes the steps as follows.

In Step S101, a corrosion operation and an expansion operation are performed on an image data successively by using a preset structural element, to obtain a structure template.

In an embodiment of the disclosure, the above image data is a coronary angiography image after a downsampling processing. For large-size original CTA data, in order to quickly extract a large-scale ascending aorta structure without affecting the precision of structure extraction, the image size may be downsampled to a half of the original size. Some noise and some structures irrelative to the aorta in the above image data may be suppressed or weakened. By using a preset structural element, the corrosion operation is performed on the image data I firstly, and then the expansion operation is performed thereon, to obtain the structure template B. The above structure template is a structure excluding a pulmonary region.

Further, a sphere of which a radius is controlled at a preset volume element is taken as the above preset structural element, and according to the step of first performing a corrosion operation on the image data via a preset structural element and then performing an expansion operation on the image data via a preset structural element, the obtained structure template includes: an ascending aorta, partial atrium and ventricle and a descending aorta, where the ascending aorta and the partial atrium and ventricle coexist in a spatially-communicating region, and the descending aorta does not spatially communicate with the ascending aorta and the partial atrium and ventricle.

Specifically, a sphere of which a radius is controlled at a preset volume element is selected. The number of the above preset volume elements is 6±2, the sphere of which a radius is controlled at a preset volume element is taken as the preset structural element $K_r$, and a structure template I' is obtained by first performing a corrosion operation on the image data I via the preset structural element $K_r$ and then performing an expansion operation I on the image data via the preset structural element $K_r$. The above operational formula is expressed as: $I' = I \circ K_r = (I \ominus K_r) \oplus K_r$.

In Step S102, a transformation are performed in layer-by-layer on slice images of the structure template, to acquire a first ascending aorta structure in the structure template, and an aorta center coordinate and an aorta radius are acquired in the last layer of slice image of the structure template.

In an embodiment of the disclosure, a Hough Transform is performed on slice images of the structure template, that is, on the an axial position planes of the structure template (i.e., a heart horizontal sections). A circular region corresponding to the aorta is selected in each slice image via Hough Transform, and then the circular region is partitioned and a morphological opening operation is performed to obtain a first ascending aorta structure $A_N$, and an aorta center coordinate $C_{oN}$ and an aorta radius $R_{oN}$ are acquired in the last layer of slice image of the structure template.

Further, during the transformation in layer-by-layer, if the distance between the aorta center coordinates of the current slice image and the preceding slice image is greater than a preset deviation value, the current slice image will be determined to be the last layer of slice image, and the aorta center coordinate and the aorta radius in the last layer of slice image are acquired.

Specifically, during the transformation in layer-by-layer, the aorta center coordinate $C_o(n)$ and the aorta radius $R_o(n)$ of the current slice image are transformed in layer by layer, wherein n=1, 2, ..., N. the preset deviation value is set, and the preset deviation value is $\varepsilon = 6 \pm 2$. When the distance between the aorta center coordinates of adjacent two layers is $D_n > \varepsilon$, the exploration would be stopped. At this time, the current slice image is determined to be the last layer of slice image, and the aorta center coordinate $C_{oN}$ and the aorta radius $R_{oN}$ in the last layer of slice image are acquired.

In Step S103, a binarized spherical structure is established according to the aorta center coordinate and the aorta radius, and a second ascending aorta structure is synthesized by combining the first ascending aorta structure with the structure template and the binarized spherical structure.

In an embodiment of the disclosure, at the aorta center coordinate $C_{oN}$, a binarized spherical structure $Sph_X$ is established by taking the aorta radius $R_{oN}$ as the radius, and a second ascending aorta structure $A_S$ is synthesized by combining the first ascending aorta structure $A_N$ with the structure template B and the binarized spherical structure $Sph_X$. The calculation formula is:

$$A_S = (A_N \cup Sph_X) \cap B$$

wherein, $A_S$ is the second ascending aorta structure, $A_N$ is the first ascending aorta structure, $Sph_X$ is the binarized spherical structure and B is the structure template. Corrosion is performed via a morphological opening operation, so that a supplementary region at the root of the ascending aorta, i.e., an aortic sinus region, is obtained, and the second ascending aorta structure $A_S$ is an intact ascending aorta structure of the aortic sinus.

In an embodiment of the disclosure, a corrosion operation and an expansion operation are performed on the image data to corrode the lung-related structures and to preserve the structures of the heart and the aorta. The first ascending aorta structure is acquired via the transformation in layer-by-layer, and a second ascending aorta structure is synthesized by combining the first ascending aorta structure with the binarized spherical structure. Corrosion is performed via a morphological opening operation, so that a supplementary region at the root of the ascending aorta is obtained, thereby extracting the shapes of the ascending aorta and the aortic sinus at the root thereof. Therefore, the structure and the form of the aorta can be precisely visualized, to provide an important reference for the automatic centerline extraction, partition and computer intelligence-assisted intervention of blood vessels, thereby greatly improving the level and capacity of medical image researches in solving clinical issues.

Embodiment 2

Figure 2:
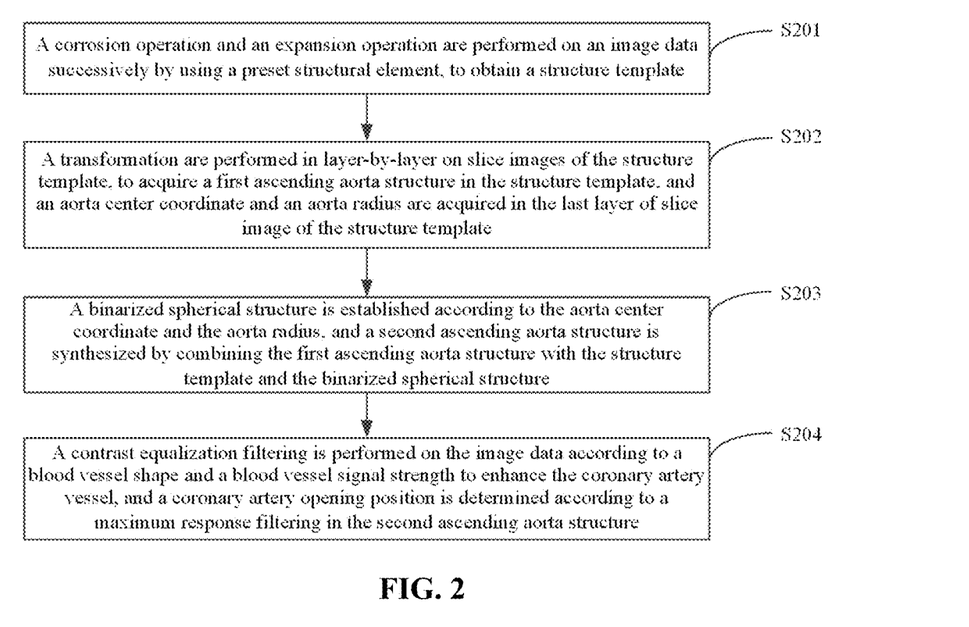
FIG. 2 is a flow chart of a method for extracting a cardiovisceral vessel from a CTA image according to Embodiment 2 of the disclosure.

FIG. 2 shows a flow chart of a method for extracting a cardiovisceral vessel from a CTA image according to Embodiment 2 of the disclosure. For easy illustration, only the parts related to an embodiment of the disclosure are shown. The method includes the steps as follows.

In Step S201, a corrosion operation and an expansion operation are performed on an image data successively by using a preset structural element, to obtain a structure template.

In Step S202, a transformation are performed in layer-by-layer on slice images of the structure template, to acquire a first ascending aorta structure in the structure template, and an aorta center coordinate and an aorta radius are acquired in the last layer of slice image of the structure template.

In Step S203, a binarized spherical structure is established according to the aorta center coordinate and the aorta radius, and a second ascending aorta structure is synthesized by combining the first ascending aorta structure with the structure template and the binarized spherical structure.

In Step S204, a contrast equalization filtering is performed on the image data according to a blood vessel shape and a blood vessel signal strength to enhance the coronary artery vessel, and a coronary artery opening position is determined according to a maximum response filtering in the second ascending aorta structure.

In an embodiment of the disclosure, in order to enhance the blood vessels of the heart, prevent the contrast of the vessels in the heart region from being very low and prevent the vessel information from being suppressed, the contrast equalization filtering is performed on the image data according to the blood vessel shape and the blood vessel signal strength to enhance the coronary artery vessel. It is assumed that $F_A$ and $F_B$ are blood vessel shape measures, $F_C$ is a blood vessel signal strength measure which may be configured to improve the signal-to-noise ratio of the blood vessels in the heart region, where:

$$F_A = e^{-\frac{(1-R_A)^2}{2\alpha^2}}, F_B = e^{-\frac{R_B^2}{2\beta^2}},$$

$$F_C = \begin{cases} \gamma_C \cdot e^{-\frac{(Z_\sigma - R_C)^2}{2C^2}} & Z_\sigma \leq c \\ \gamma_C + (1-\gamma_C) \cdot \frac{(Z_\sigma - R_C)}{(1-r_h) \cdot c} & Z_\sigma > c \end{cases}$$

wherein, $R_A$ and $R_B$ are two measure functions based on the characteristic values of a Hessian Matrix, and $R_A$ is configured to distinguish between a sheet structure and a linear structure, $R_B$ is configured to distinguish between dot structure and a linear structure, $\alpha$, $\beta$ and c function as thresholds for controlling the sensitivity of $R_A$, $R_B$ and $R_C$, $\gamma_C \in (0,1)$ is a response expectation constant with a general value of 0.5~0.8. Under a certain scale $\sigma$, space Hessianmatrix norm $\|H_\sigma\| = \sqrt{\Sigma_{j \leq D} \lambda_j^2}$ exhibits a high response in the pulmonary region having a large blood vessel contrast, but exhibits a small blood vessel response in the heart region. As the scale $\sigma$ increases, the $\|H_\sigma\|$ mean value and maximum value of the pulmonary region and the peripheral region both trend to monotonically increasing. Therefore, let $Z_{\sigma_0}$ be a zero matrix, then the maximum norm value under each scale is recorded as:

$$Z_{\sigma_n}(x) \triangleq \max_x\{(Z_{\sigma_{n-1}}(x), \|H_{\sigma_n}(x)\|)\}, n=1, \ldots, N$$

Then, a dynamic threshold c is found, and it may distinguish between the pulmonary region and other tissues according to $Z_\sigma \leq c$ and $Z_\sigma > c$ respectively in measure $F_C$. The non-pulmonary region is defined as $\theta_h$, and the maximum norm is calculated in $\theta_h$ and total space $\Theta$ respectively via $r_h = \|H_{\sigma_n}(x)\|_{max}/\|H_{\sigma_n}(\Theta)\|_{max}$, and $r_h \in (0.65,1)$ is obtained via experimental statistics, and then parameter $c = r_h \cdot mux(Z_\sigma)$ is obtained, and let $R_c = c$, a blood vessel characteristic graph $V(z,\sigma)$ after contrast enhancement is finally obtained, $$V(x, \sigma) \triangleq \begin{cases} 0 & \text{if } \lambda_2 > 0 \text{ or } \lambda_3 > 0 \\ F_A \cdot F_B \cdot F_C & \text{else} \end{cases},$$

wherein $\lambda_2$ and $\lambda_3$ are respectively the second characteristic value and the third characteristic value of the space Hessian matrix.

Figure 3:
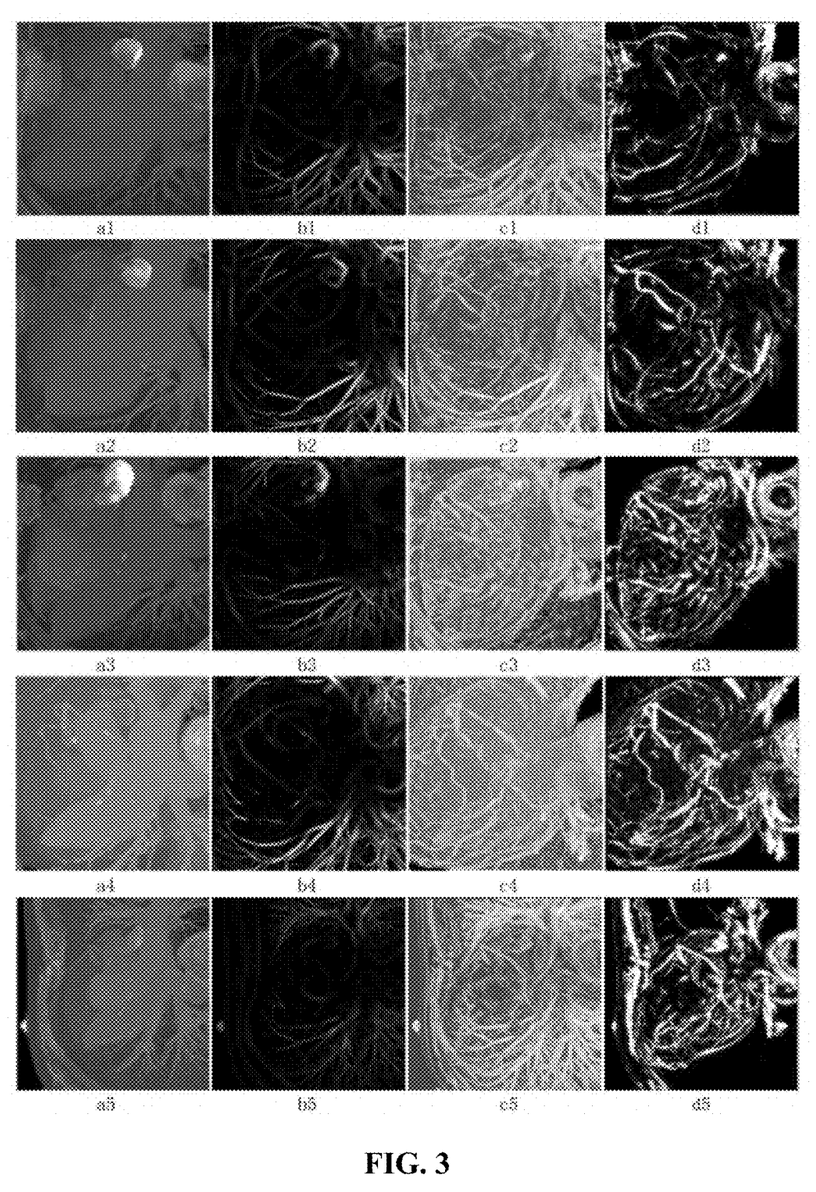
FIG. 3 is a comparison diagram of axial projection effects.

As shown in FIG. 3, a1-a5 are axial projection effect drawings of the CTA data, b1-b5 are axial projection effect drawings after multi-scale filtering, c1-c5 are axial projection effect drawings after contrast equalization filtering, and d1-d5 are axial projection effect drawings in the non-pulmonary region $\theta_h$ of the disclosure. It may be seen from the contrast among d1-d5, b1-b5 and c1-c5 that: b1-b5 clearly show that the traditional multi-scale filtering can only enhance the pulmonary blood vessel, but cannot enhance the cardiovisceral vessels in the heart region; c1-c5 clearly show that the blood vessels in the heart region are obviously enhanced, and d1-d5 clearly show that the blood vessels in the pulmonary region are heavily shielded.

Embodiment 3

Figure 4:
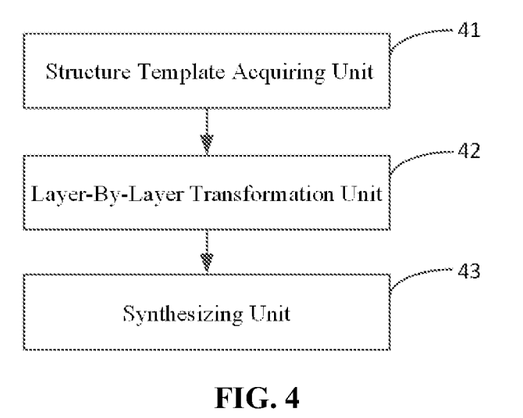
FIG. 4 is a structural representation of an apparatus for extracting a cardiovisceral vessel from a CTA image according to Embodiment 3 of the disclosure.

FIG. 4 shows a structural representation of an apparatus for extracting a cardiovisceral vessel from a CTA image according to Embodiment 3 of the disclosure. For easy illustration, only the parts related to an embodiment of the disclosure are shown, and the apparatus for extracting a cardiovisceral vessel from a CTA image according to Embodiment 3 of the disclosure includes a structure template acquiring unit 41, a layer-by-layer transformation unit 42 and a synthesizing unit 43.

The structure template acquiring unit 41 is configured for performing a corrosion operation and an expansion operation on an image data successively via a preset structural element to obtain a structure template, wherein the image data is a coronary angiography image after a downsampling processing, and the structure template is a structure excluding a pulmonary region.

In an embodiment of the disclosure, the above image data is a coronary angiography image after a downsampling processing. For large-size original CTA data, in order to quickly extract a large-scale ascending aorta structure without affecting the precision of structure extraction, the image size may be downsampled to a half of the original size. Some noise and some structures irrelative to the aorta in the above image data may be suppressed or weakened. By using a preset structural element, the corrosion operation is performed on the image data I firstly, and then the expansion operation is performed thereon, to obtain the structure template B. The above structure template is a structure excluding a pulmonary region.

Further, the structure template acquiring unit includes: a structure template acquiring subunit, configured for taking as the above preset structural element a sphere of which a radius is controlled at a preset volume element, and first performing the corrosion operation on the image data via the preset structural element and then performing the expansion operation on the image data via the preset structural element to obtain the structural template, where the obtained structure template includes: an ascending aorta, partial atrium and ventricle and a descending aorta, wherein, the ascending aorta and the partial atrium and ventricle coexist in a spatially-communicating region, and the descending aorta does not spatially communicate with the ascending aorta and the partial atrium and ventricle.

Specifically, a sphere of which a radius is controlled at a preset volume element is selected. The number of the above preset volume elements is 6±2, the sphere of which a radius is controlled at a preset volume element is taken as the preset structural element $K_r$, and a structure template I' is obtained by first performing a corrosion operation on the image data I via the preset structural element and then performing an expansion operation I on the image data via the preset structural element $K_r$. The above operational formula is expressed as: $I' = I \circ K_r = (I \ominus K_r) \oplus K_r$.

The layer-by-layer transformation unit 42 is configured for performing a transformation in layer-by-layer on slice images of the structure template to acquire a first ascending aorta structure in the structure template, and acquiring an aorta center coordinate and an aorta radius in the last layer of slice image of the structure template.

In an embodiment of the disclosure, a Hough Transform is performed on slice images of the structure template, that is, on the an axial position planes of the structure template (i.e., a heart horizontal sections). A circular region corresponding to the aorta is selected in each slice image via Hough Transform, and then the circular region is partitioned and a morphological opening operation is performed to obtain a first ascending aorta structure $A_N$, and an aorta center coordinate $C_{oN}$ and an aorta radius $R_{oN}$ are acquired in the last layer of slice image of the structure template.

Further, the layer-by-layer transformation unit includes: a layer-by-layer transformation subunit, which is configured for determining, during the transformation in layer-by-layer if a distance between the aorta center coordinates of the current slice image and the preceding slice image is larger than a preset deviation value, the current slice image to be the last layer of slice image, and acquiring the aorta center coordinate and the aorta radius in the last layer of slice image.

Specifically, during the transformation in layer-by-layer, the aorta center coordinate $C_o(n)$ and the aorta radius $R_o(n)$ of the current slice image are transformed in layer by layer, wherein n=1, 2, ..., N. the preset deviation value is set, and the preset deviation value is ε=6±2. When the distance between the aorta center coordinates of adjacent two layers is $D_n > \varepsilon$, the exploration would be stopped. At this time, the current slice image is determined to be the last layer of slice image, and the aorta center coordinate $C_{oN}$ and the aorta radius $R_{oN}$ in the last layer of slice image are acquired.

The synthesizing unit 43 is configured for establishing a binarized spherical structure according to the aorta center coordinate and the aorta radius and synthesizing a second ascending aorta structure by combining the first ascending aorta structure with the structure template and the binarized spherical structure.

In an embodiment of the disclosure, at the aorta center coordinate $C_{oN}$, a binarized spherical structure $Sph_X$ is established by taking the aorta radius $R_{oN}$ as the radius, and a second ascending aorta structure $A_S$ is synthesized by combining the first ascending aorta structure $A_N$ with the structure template B and the binarized spherical structure $Sph_X$. The calculation formula is:

$$A_S = (A_N \cup Sph_X) \cap B$$

wherein, $A_S$ is the second ascending aorta structure, $A_N$ is the first ascending aorta structure, $Sph_X$ is the binarized spherical structure and B is the structure template. Corrosion is performed via a morphological opening operation, so that a supplementary region at the root of the ascending aorta, i.e., an aortic sinus region, is obtained, and the second ascending aorta structure $A_S$ is an intact ascending aorta structure of the aortic sinus.

In an embodiment of the disclosure, a corrosion operation and an expansion operation are performed on the image data to corrode the lung-related structures and to preserve the structures of the heart and the aorta. The first ascending aorta structure is acquired via the transformation in layer-by-layer, and a second ascending aorta structure is synthesized by combining the first ascending aorta structure with the binarized spherical structure. Corrosion is performed via a morphological opening operation, so that a supplementary region at the root of the ascending aorta is obtained, thereby extracting the shapes of the ascending aorta and the aortic sinus at the root thereof. Therefore, the structure and the form of the aorta can be precisely visualized, to provide an important reference for the automatic centerline extraction, partition and computer intelligence-assisted intervention of blood vessels, thereby greatly improving the level and capacity of medical image researches in solving clinical issues.

In an embodiment of the disclosure, each unit of the apparatus for extracting a cardiovisceral vessel from a CTA image may be implemented by the corresponding hardware or software unit, and each unit may be an independent software or hardware unit, or may be integrated as a software or hardware unit, without limiting the disclosure.

Embodiment 4

Figure 5:
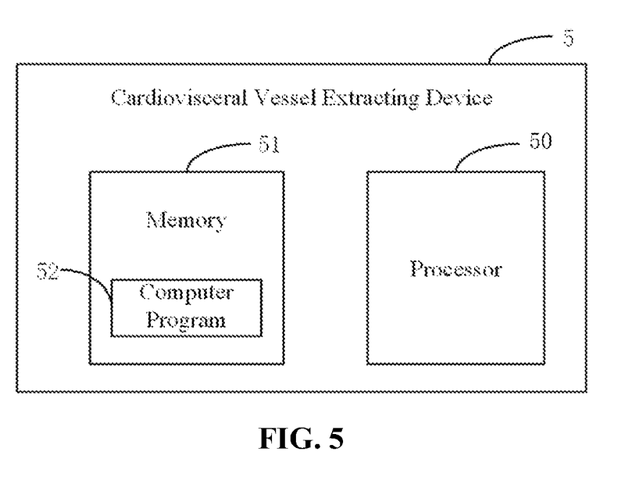
FIG. 5 is a structural representation of a device for extracting a cardiovisceral vessel from a CTA image according to Embodiment 4 of the disclosure.

FIG. 5 shows a structural representation of a device for extracting a cardiovisceral vessel from a CTA image according to Embodiment 4 of the disclosure. For easy illustration, only the parts related to an embodiment of the disclosure are shown.

The device 5 for extracting a cardiovisceral vessel from a CTA image according to an embodiment of the disclosure includes a processor 50, a memory 51 and a computer program 52 that is stored on the memory 51 and may be executed on the processor 50. When computer program 52 is executed by the processor 50, the steps in the above embodiments of the method for extracting a cardiovisceral vessel from a CTA image, for example, the Steps S101 to S103 shown in FIG. 1, may be implemented. Or, when the computer program 52 is executed by the processor 50, the function of each module/unit in the above device embodiments, for example, the function of the modules 41 to 43 shown in FIG. 4, may be implemented.

In an embodiment of the disclosure, a corrosion operation and an expansion operation are performed on the image data to corrode the lung-related structures and to preserve the structures of the heart and the aorta. The first ascending aorta structure is acquired via the transformation in layer-by-layer, and a second ascending aorta structure is synthesized by combining the first ascending aorta structure with the binarized spherical structure. Corrosion is performed via a morphological opening operation, so that a supplementary region at the root of the ascending aorta is obtained, thereby extracting the shapes of the ascending aorta and the aortic sinus at the root thereof. Therefore, the structure and the form of the aorta can be precisely visualized, to provide an important reference for the automatic centerline extraction, partition and computer intelligence-assisted intervention of blood vessels, thereby greatly improving the level and capacity of medical image researches in solving clinical issues.

Embodiment 5

In an embodiment of the disclosure, it provides a computer-readable storage medium having a computer program stored thereon. When executed by a processor, the computer program may implement the steps in each of the above embodiments of the method for extracting a cardiovisceral vessel from a CTA image, for example, Steps S101 to S103 in FIG. 1. Or, when executed by a processor, the computer program may realize the function of each module/unit in each of the above device embodiments, for example, the function of the modules 41 to 43 shown in FIG. 4.

In an embodiment of the disclosure, a corrosion operation and an expansion operation are performed on the image data to corrode the lung-related structures and to preserve the structures of the heart and the aorta. The first ascending aorta structure is acquired via the transformation in layer-by-layer, and a second ascending aorta structure is synthesized by combining the first ascending aorta structure with the binarized spherical structure. Corrosion is performed via a morphological opening operation, so that a supplementary region at the root of the ascending aorta is obtained, thereby extracting the shapes of the ascending aorta and the aortic sinus at the root thereof. Therefore, the structure and the form of the aorta can be precisely visualized, to provide an important reference for the automatic centerline extraction, partition and computer intelligence-assisted intervention of blood vessels, thereby greatly improving the level and capacity of medical image researches in solving clinical issues.

The computer-readable storage medium according to an embodiment of the disclosure may include any entity or apparatus and recording medium that can carry a computer program code, for example, a memory such as ROM/RAM, magnetic disk, compact disk and FLASH memory, etc.

The above description only shows some preferred embodiments of the disclosure, without limiting the disclosure. All modifications, equivalent substitutions and improvements within the spirit and principle of the disclosure should fall into the protection scope of the disclosure.

What is claimed is:

1. A method for extracting a cardiovisceral vessel from a CTA image, comprising the steps of:
    performing a corrosion operation and an expansion operation on an image data successively via a preset structural element to obtain a structure template, wherein the image data is a coronary angiography image after a downsampling processing, and the structure template is a structure excluding a pulmonary region;
    performing a transformation in layer-by-layer on slice images of the structure template to acquire a first ascending aorta structure in the structure template, and acquiring an aorta center coordinate and an aorta radius in the last layer of slice image of the structure template; and
    establishing a binarized spherical structure according to the aorta center coordinate and the aorta radius, and synthesizing a second ascending aorta structure by combining the first ascending aorta structure with the structure template and the binarized spherical structure.

2. The method of claim 1, wherein the step of performing a corrosion operation and an expansion operation on an image data successively via a preset structural element to obtain a structure template comprises:
    taking as the preset structural element a sphere of which a radius is controlled at a preset volume element, and first performing the corrosion operation on the image data via the preset structural element and then performing the expansion operation on the image data via the preset structural element, to obtain the structural template.

3. The method of claim 1, wherein the step of performing a layer-by-layer transformation on slice images of the structure template to acquire a first ascending aorta structure in the structure template and acquiring an aorta center coordinate and an aorta radius in the last slice image of the structure template comprises:
    determining, during the transformation in layer-by-layer if a distance between the aorta center coordinates of the current slice image and the preceding slice image is larger than a preset deviation value, the current slice image to be the last layer of slice image, and acquiring the aorta center coordinate and the aorta radius in the last layer of slice image.

4. The method of claim 1, wherein a calculation formula for synthesizing a second ascending aorta structure by combining the first ascending aorta structure with the structure template and the binarized spherical structure is:

$$A_S = (A_N \cup Sph_X) \cap B$$

wherein, $A_S$ is the second ascending aorta structure, $A_N$ is the first ascending aorta structure, $Sph_X$ is the binarized spherical structure and B is the structure template.

5. The method of claim 1, further comprising:
    performing a contrast equalization filtering on the image data according to a blood vessel shape and a blood vessel signal strength to enhance the coronary artery vessel, and determining a coronary artery opening position according to a maximum response filtering in the second ascending aorta structure.

6. An apparatus for extracting a cardiovisceral vessel from a CTA image, comprising:
    a structure template acquiring unit, configured for performing a corrosion operation and an expansion operation on an image data successively via a preset structural element to obtain a structure template, wherein the image data is a coronary angiography image after a downsampling processing, and the structure template is a structure excluding a pulmonary region;
    a layer-by-layer transformation unit, configured for performing a transformation in layer-by-layer on slice images of the structure template to acquire a first ascending aorta structure in the structure template, and acquiring an aorta center coordinate and an aorta radius in the last layer of slice image of the structure template; and
    a synthesizing unit, configured for establishing a binarized spherical structure according to the aorta center coordinate and the aorta radius and synthesizing a second ascending aorta structure by combining the first ascending aorta structure with the structure template and the binarized spherical structure.

7. The apparatus of claim 6, wherein the structure template acquiring unit comprises:
   a structure template acquiring subunit, configured for taking as the preset structural element a sphere of which a radius is controlled at a preset volume element, and first performing the corrosion operation on the image data via the preset structural element and then performing the expansion operation on the image data via the preset structural element to obtain the structural template.

8. The apparatus of claim 6, wherein the layer-by-layer transformation unit comprises:
   a layer-by-layer transformation subunit, configured for determining, during the transformation in layer-by-layer if a distance between the aorta center coordinates of the current slice image and the preceding slice image is larger than a preset deviation value, the current slice image to be the last layer of slice image, and acquiring the aorta center coordinate and the aorta radius in the last layer of slice image.

9. A device for extracting a cardiovisceral vessel from a CTA image, comprising: a memory, a processor and a computer program that is stored in memory and is executable on the processor, wherein when the computer program is executed by the processor, steps of a method for extracting a cardiovisceral vessel from a CTA image are implemented, wherein the steps of the method comprises:
   performing a corrosion operation and an expansion operation on an image data successively via a preset structural element to obtain a structure template, wherein the image data is a coronary angiography image after a downsampling processing, and the structure template is a structure excluding a pulmonary region;
   performing a transformation in layer-by-layer on slice images of the structure template to acquire a first ascending aorta structure in the structure template, and acquiring an aorta center coordinate and an aorta radius in the last layer of slice image of the structure template; and
   establishing a binarized spherical structure according to the aorta center coordinate and the aorta radius, and synthesizing a second ascending aorta structure by combining the first ascending aorta structure with the structure template and the binarized spherical structure.

10. A non-transitory computer-readable storage medium having a computer program stored thereon, wherein the steps of the method according to claim 1 are implemented when the computer program is executed by a processor, the steps of the method comprises:
   performing a corrosion operation and an expansion operation on an image data successively via a preset structural element to obtain a structure template, wherein the image data is a coronary angiography image after a downsampling processing, and the structure template is a structure excluding a pulmonary region;
   performing a transformation in layer-by-layer on slice images of the structure template to acquire a first ascending aorta structure in the structure template, and acquiring an aorta center coordinate and an aorta radius in the last layer of slice image of the structure template; and
   establishing a binarized spherical structure according to the aorta center coordinate and the aorta radius, and synthesizing a second ascending aorta structure by combining the first ascending aorta structure with the structure template and the binarized spherical structure.

* * * * *